United States Patent [19]

Baker

[11] 4,245,370
[45] Jan. 20, 1981

[54] CONTROL CIRCUIT FOR PROTECTING VACUUM CLEANER MOTOR FROM JAMMED BEATER BRUSH DAMAGE

[75] Inventor: Daniel A. Baker, St. Joseph, Mich.

[73] Assignee: Whirlpool Corporation, Benton Harbor, Mich.

[21] Appl. No.: 1,823

[22] Filed: Jan. 8, 1979

[51] Int. Cl.³ .................. H02H 7/08; A47L 9/28
[52] U.S. Cl. ........................... 15/319; 15/391; 318/461; 361/23
[58] Field of Search ............. 15/319, 390, 391; 318/461, 463; 361/23, 24

[56] References Cited

U.S. PATENT DOCUMENTS

| | | | |
|---|---|---|---|
| 2,323,554 | 7/1943 | Mason | 318/461 X |
| 2,421,235 | 5/1947 | Basinger | 15/319 X |
| 2,451,816 | 10/1948 | Dunn | 318/461 |
| 2,467,582 | 4/1949 | Corkran | 318/463 X |
| 2,472,526 | 6/1949 | Frazee | 318/461 |
| 3,266,078 | 8/1966 | Brown et al. | 15/391 X |
| 3,389,321 | 6/1968 | Miller et al. | 318/463 |
| 3,536,977 | 10/1970 | Porter | 318/461 |
| 3,728,604 | 4/1973 | Grygera | 318/459 |
| 3,845,375 | 11/1973 | Stiebel | 318/463 |
| 4,025,832 | 5/1977 | Jones | 318/317 |
| 4,099,291 | 7/1978 | Bowerman | 15/390 |
| 4,163,999 | 8/1979 | Eaton et al. | 15/391 X |

FOREIGN PATENT DOCUMENTS 2243105 3/1974 Fed. Rep. of Germany ............. 361/24

Primary Examiner—Christopher K. Moore
Attorney, Agent, or Firm—Wegner, Stellman, McCord, Wiles & Wood

[57] ABSTRACT

A control circuit for effectively preventing damage to the blower or fan motor of a vacuum cleaner which could otherwise result from a jammed condition of the beater brush thereof. The control circuit effects discontinuation of the energization of the motor in the event the rotational speed of the beater brush drops below a preselected speed. The discontinuation of energization may be effected by the control a preselected period of time after the speed drops below the preselected speed. An indicating device may be provided for indicating such discontinuation of energization. A second indicating device may be provided for indicating a reduction in speed of the beater brush less than that sufficient to cause discontinuation of the energization but sufficient to warrant warning the user that a partial jamming of the beater brush has occurred. The control may be arranged to require manual operation of the operating switch of the vacuum cleaner to the "off" condition and subsequently to the "on" condition to re-energize the motor subsequent to such discontinuation of energization. The control includes means for causing the discontinuation of energization of the motor in the event the motor does not come up to a preselected speed within a preselected period of time after such operation of the control switch to the "on" position. The speed of the beater brush may be sensed by a Hall effect sensor responding to magnetic pulses from a magnet rotatable with the beater brush.

30 Claims, 9 Drawing Figures

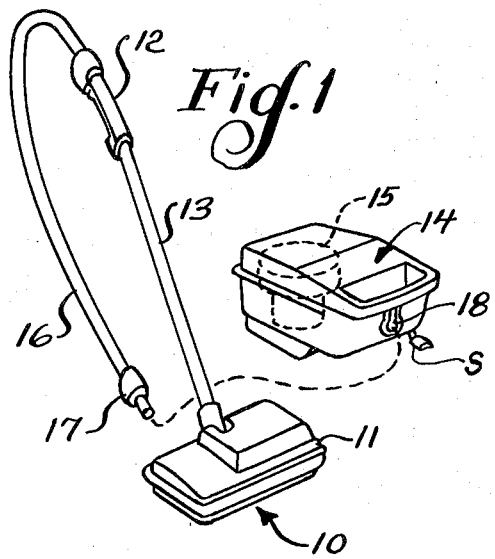
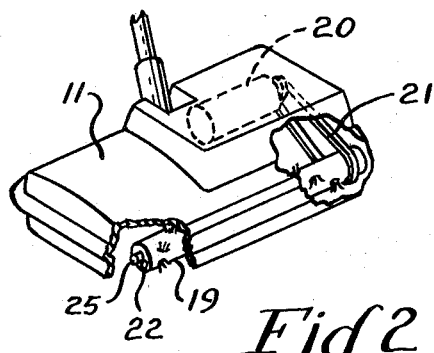
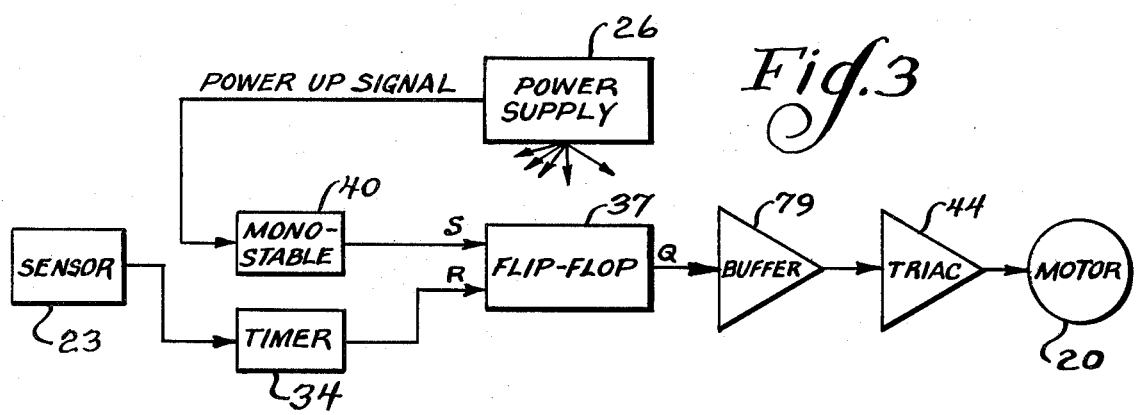
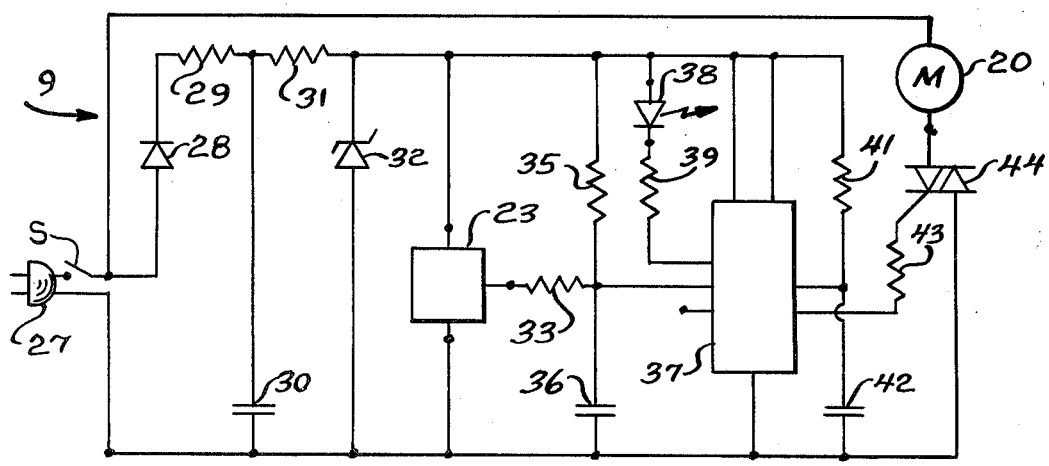

CONTROL CIRCUIT FOR PROTECTING VACUUM CLEANER MOTOR FROM JAMMED BEATER BRUSH DAMAGE

TECHNICAL FIELD

This invention relates to vacuum cleaners and in particular to means for protecting the drive motor from damage as may result from a jammed beater brush condition.

BACKGROUND ART

In U.S. Pat. No. 2,323,554 of Richard D. Mason, a vacuum cleaning apparatus is disclosed wherein a rotor actuated switch and timing means are provided to interrupt the operating circuit of the driving motor of the cleaner a predetermined time interval after movement of the nozzle over the surface undergoing cleaning is arrested. The time interval is made to be long enough to permit stopping of movement of the vacuum cleaner for short intervals without interruption of the operating circuit.

In U.S. Pat. No. 2,451,816 of George B. Dunn, a web break detector utilizes a photoelectric means responding to indicia printed on the web to operate a control to actuate an alarm in response to a breakage of the web. The alarm circuit is arranged to give a visual or audible alarm, as desired, or to automatically disconnect the driving motor of the machine.

Arthur G. Corkran, in U.S. Pat. No. 2,467,582, shows a speed responsive motor control system utilizing a control which is responsive to rotary speed of a device, such as for shutting down the drive motor thereof when the motor speed is reduced to a predetermined number of revolutions per minute. The circuit utilizes an electron discharge tube having a grid on which is impressed a periodic output potential from a transformer so as to render the tube conducting as long as the periodically varied magnetic coupling between the primary and secondary windings of the transformer is sufficiently frequent. The circuit further includes means to delay the dropout of the relay to provide the maintained energization as long as the frequency is at the desired value.

In U.S. Pat. No. 2,472,526, Albert C. Frazee shows an underspeed motor protective system for use in connection with a motor driven conveyor belt. The control utilizes a cam for maintaining energization of a relay.

Robert D. Miller et al, in U.S. Pat. No. 3,389,321, show a frequency sensing detector for stopping a motor upon slowdown. The control includes means to generate electrical pulses at a frequency proportional to the advancement rate of an apparatus with means for receiving the pulses to effect the energization of the motor in response to a predetermined decrease in the frequency of pulse reception.

In U.S. Pat. No. 3,536,977, Virgle E. Porter shows a control circuit for stopping a motor in response to a torque overload. The control circuit senses a preselected drop in the speed of a device by means of a signal produced in each cycle of rotation thereof. If the signal is of both an appropriate duration and amplitude, the control apparatus is actuated. The control includes a rotating disc passing between a stationary magnet and a reed switch so as to open the switch once during each revolution of the disc. The opening and closing of the switch provides a pulse with the frequency of the pulse generation being sensed in the control circuit for controlling the operation of the motor.

James W. Grygera discloses, in U.S. Pat. No. 3,728,604, a motor control system wherein the electromotive force generated by the motor and the motor armature current are sensed on starting and stopping. The control circuit includes a plurality of gates in a flip-flop arrangement.

An electronic rotational sensor is disclosed in U.S. Pat. No. 3,845,375 of Ariel I. Stiebel. The sensor circuit utilizes a light sensing means which is pulsed. The pulses are varied by the rotating apparatus. Charging means in the form of capacitors produce a ramp voltage at a rate proportional to the rate of the apparatus rotation for controlling an SCR.

Emory E. Jones, III, in U.S. Pat. No. 4,025,832, shows an electronic slip detector circuit for use with a conveyor belt. The control includes a magnetic transducer operated by a plurality of magnets rotatable with a conveyor roller and means for converting the sensed pulses produced by the magnets to a DC voltage. When the voltage drops below an adjustable reference, the drive motor is de-energized.

DISCLOSURE OF THE INVENTION

The present invention comprehends a belt protection control circuit for an upright vacuum cleaner which interrupts operation of the motor in the event the beater brush becomes jammed.

The rotating beater brush is provided with a permanent magnet which rotates with the brush. A sensor is mounted adjacent the brush, such as on the nonrotating bearing structure, and is activated when the rotating magnet is juxtaposed to the sensor. If jamming of the brush occurs and the brush slows down so that its rotation speed drops below a preset threshold speed, the control circuit, in response to the resulting signal received from the sensor, causes the brush drive motor to be de-energized, thereby protecting the belt against damage.

More specifically, the sensor of the illustrated embodiment is a Hall effect device magnetically coupled to magnetic means rotatable with the beater brush so that a signal is produced for every beater brush revolution. If the time between sensor signals exceeds the threshold of a timer provided in the control circuit, the sensor triggers the timer so that the timer resets an associated flip-flop. As a result of the flip-flop being reset, an output buffer goes low, causing a triac for controlling the brush drive motor to turn off, thereby causing the motor to be automatically de-energized. Once the beater brush motor is turned off by the control circuit, the power switch must be turned off and then turned on again after the jam is removed to restore normal operation.

The turning on of the power switch triggers a monostable which sets the flip-flop. If the threshold speed of the timer is not reached by the beater brush before the monostable goes low, the motor will again be de-energized.

The control circuit may also include a tachometer which provides visual indication of the speed of the beater brush so as to alert the user to a possible unsafe operating condition that might damage the belt. At the time the sensor signals a low speed condition so as to de-energize the motor, a red warning light is energized for indicating to the user the beater brush jam.

The control may further be arranged to provide a warning indication prior to the de-energization of the motor. Thus, where the brush rotation drops, but to a lesser degree than that for effecting the motor de-energization, the motor remains on but a yellow light is energized for indicating a heavy load on the beater brush.

Under normal operating conditions, a green indicating light is energized indicating said proper operation of the beater brush.

BRIEF DESCRIPTION OF THE DRAWING

Other features and advantages of the invention will be apparent from the following description taken in connection with the accompanying drawing wherein:

FIG. 1 is a perspective view of a vacuum cleaner embodying the present invention;

FIG. 2 is a fragmentary enlarged view of the cleaner head for the vacuum cleaner of FIG. 1 illustrating the beater brush connected to the brush drive motor by the belt;

FIG. 3 is a block diagram of the control circuit for the vacuum cleaner of FIG. 1;

FIG. 4 is a schematic of the control circuit for the vacuum cleaner of FIG. 1;

BEST MODE FOR CARRYING OUT THE INVENTION

Figure 5:
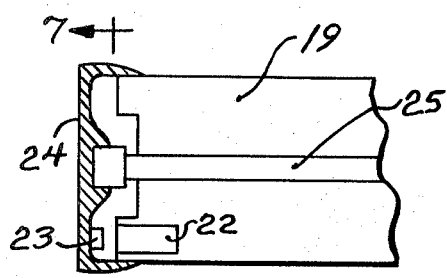
FIG. 5 is a fragmentary sectional view of the bearing structure, the sensor mounted thereon, and the rotatable beater brush for the vacuum cleaner of FIG. 1.
Figure 6:
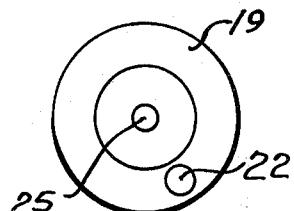
FIG. 6 is an end view of the beater brush of FIG. 5.
Figure 7:
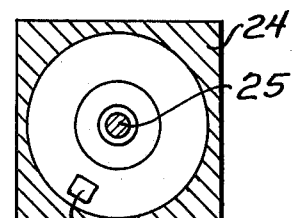
FIG. 7 is a side elevation view of the bearing structure for the beater brush of FIG. 5.

In the exemplary embodiment of the invention as disclosed in FIGS. 1-9 of the drawing, a control circuit generally designated 9 is provided in an upright vacuum cleaner generally designated 10. The vacuum cleaner 10 comprises a vacuum cleaner head 11 connected to a control means and handle portion 12 by a straight metal tube or wand 13. A canister 14, in which is mounted a motor driven suction unit 15, is connected to the vacuum cleaner head 11 by a flexible hose 16, a first end 17 of which is adapted to be received in a female connector 18.

A rotating beater brush 19, mounted inside the vacuum cleaner head 11, is driven by a motor 20 by means of an endless belt 21. A permanent magnet 22 is mounted on the beater brush 19, and a Hall effect sensor 23 is mounted on a nonrotating bearing structure 24 connected to the beater brush 19 by a shaft 25. Thus, magnet 22 effectively defines means for providing magnetic pulses to the sensing means 23 at a rate directly corresponding to the speed of rotation of the beater brush 19.

The control circuit for the vacuum cleaner 10 comprises a power supply 26 including a male electrical connector plug 27, one terminal of which is connected to the motor 20 via a triac 44. A second terminal of the plug 27 is connected through a diode 28 and a resistor 29 across a capacitor 30. A resistor 31 and zener diode 32 establish a reduced voltage across the Hall effect sensor 23.

The output of the Hall effect sensor 23 is connected through a resistor 33 to a timer 34 comprising a series resistor 35 and capacitor 36. The output of the timer 34 is connected to a flip-flop 37 in order to reset the flip-flop if the time between the sensor outputs exceeds the timer threshold. A light-emitting diode (LED) 38 in series with a resistor 39 is also connected to provide an output from the flip-flop 37.

The power supply 26 generates a "power up" signal which triggers a monostable 40 comprising a series resistor 41 and capacitor 42 which sets the flip-flop 37. The setting of flip-flop 37 latches the flip-flop for normal operation of the beater brush, and if the time between the sensor outputs exceeds the threshold of timer 34 reset of flip-flop 37 occurs and the flip-flop is unlatched. The output of flip-flop 37 is connected to motor 20 through a resistor 43 and a triac 44.

Figure 8:
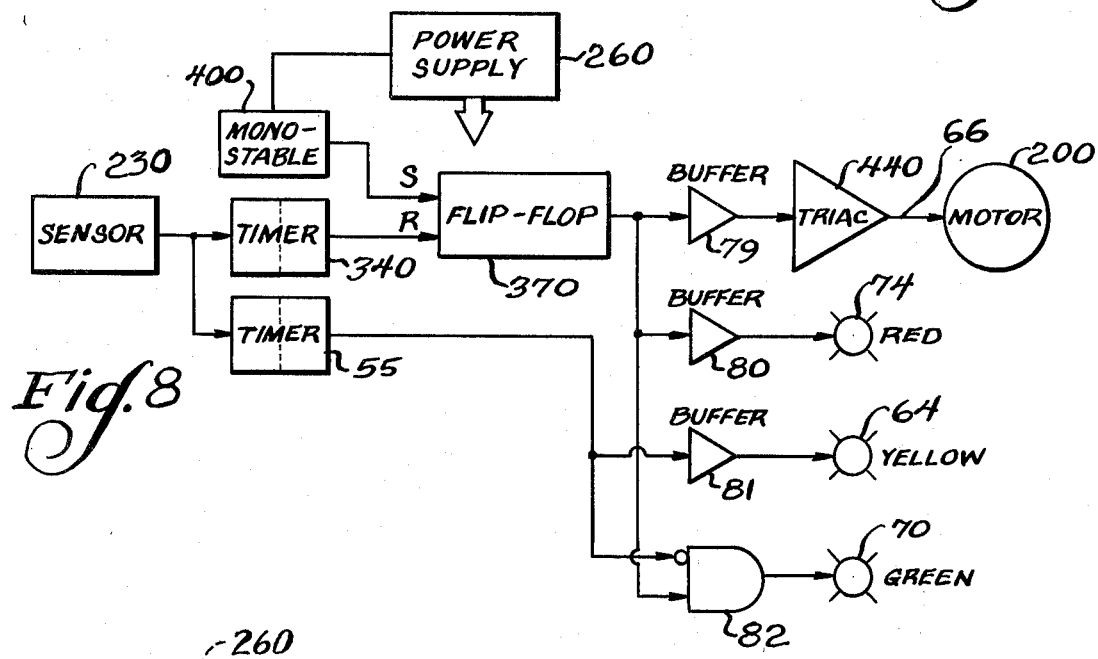
FIG. 8 is a block diagram of an alternate construction wherein a visual signal representative of motor speed is generated.
Figure 9:
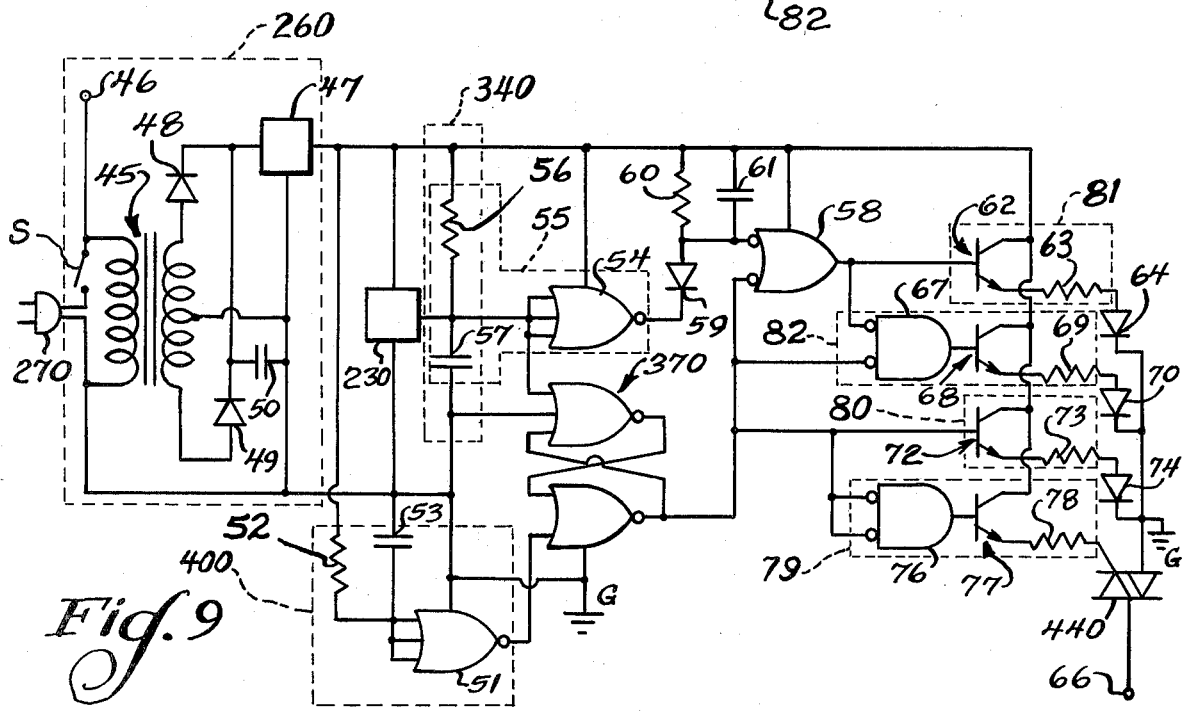
FIG. 9 is a schematic of the control circuit for the alternate construction shown in block diagram in FIG. 8.

An alternate embodiment of the control circuit for a vacuum cleaner, as shown in FIGS. 8 and 9, comprises a power supply 260 including a male electrical connector plug 270 connected to a transformer 45, one terminal of which is connected to a motor 200 by a motor lead 46. Corresponding portions of the circuit of the alternate embodiment are identified by related reference numerals. For example, the power supply 26 of FIG. 3 corresponds to the power supply 260 of FIG. 8, and so forth. The transformer 45 is connected to a voltage regulator 47 through a diode 48 and a diode 49 across a capacitor 50. The output of the voltage regulator 47 is connected to the input of a NOR gate 51 through a resistor 52 and to a Hall effect sensor 230.

The output of the Hall effect sensor 230 is connected through a capacitor 53 to NOR gate 51 which determines the threshold of timer 340. The output of NOR gate 51 is input to the flip-flop 370, which is reset if the time between sensor outputs exceeds a certain threshold time, A. The output of the Hall effect sensor 230 is also connected to a NOR gate 54 which determines the threshold time B of a timer 55.

The power supply 260 is connected to flip-flop 370 through the monostable 400 comprising a series connected resistor 52 and capacitor 53. When the system is initially powered, the monostable 400 is triggered and sets flip-flop 370 wherein set takes precedence over reset.

The output of NOR gate 54 is connected to the input of NOR gate 58 through a diode 59 and a parallel combination of a resistor 60 and a capacitor 61. The output of flip-flop 370 is also input to NOR gate 58, the output of which is connected to the base of a transistor 62. The emitter of transistor 62 is connected through a resistor 63, to yellow light 64 in the form of a light-emitting diode (LED).

A NOR gate 67 has inputs from the flip-flop 370 and from timer 55, represented by NOR gate 54 through NOR gate 58. The output of NOR gate 67 is connected to the base of a transistor 68. The emitter of transistor 68 is connected through a resistor 69 to a green light 70 in the form of an LED.

The output of the flip-flop 370 is connected to the base of a transistor 72, the emitter of which is connected through resistor 73 to a red light 74 also in the form of an LED.

The output of the flip-flop 370 is also input to a NOR gate 76, the output of which is connected to the base of a transistor 77. The emitter of transistor 77 is connected to motor 20 through a resistor 78 and triac 44 by the motor lead 66.

MODE OF OPERATION

More specifically, the control circuit of FIG. 4 is employed to interrupt motor 20 operation to effectively prevent damage to belt 21 in the event the beater brush 19 becomes jammed.

The Hall effect sensor 23 constitutes means for sensing movement of a magnet, and sensor 23 is magnetically coupled to the beater brush 19 so that an output signal from the sensor is produced for every beater brush revolution. As beater brush 19 rotates, permanent magnet 22 mounted thereon also rotates, and the Hall effect sensor 23 is activated when the magnet is juxtaposed to the sensor. If the beater brush 19 jams, the time between sensor outputs will exceed the threshold of timer 34 and timer 34 will reset the flip-flop 37. When flip-flop 37 is reset, its output is low, causing the triac 44 for controlling the brush drive motor 20 to turn off, thus de-energizing motor 20 and preventing damage to belt 21. Thus, the timer 34 effectively defines with flip-flop 37 means for discontinuing energization of motor 20 when the speed of the brush, as represented by the rate of production of the magnetic pulses by magnet 22, drops below the preselected value corresponding to the threshold of timer 34.

In order to turn the brush drive motor 20 on once it has been automatically turned off, the user must turn off the power as by suitable disconnection through power switch S which may advantageously be a foot pedal-operated switch. When the power is turned on again as by reconnection through the power switch, monostable 40 is triggered and sets flip-flop 37 for normal operation. If the beater brush jam has not been removed, beater brush 19 will not reach the threshold speed of timer 34. Monostable 40 will then go low and the motor 20 will again be de-energized, preventing damage to the belt 21.

The threshold of timer 34 is set slower than the speed of the beater brush 19 under normal operating conditions, but fast enough to quickly de-energize motor 20 in the event of a beater brush jam. The monostable time is set long enough to energize motor 20 under normal operating conditions, but short enough to quickly de-energize the motor when it attempts to start while the beater brush is jammed. Typically, the threshold of timer 34 is set at 25 ms (2400 rpm) and monostable 40 is about one second. Thus, monostable 40 (and corresponding monostable 400) functions as a timing means which provides a power up time period of about one second. Therefore, motor 20 will be de-energized in a maximum time of 33 ms (25 ms and 0.5/60 Hz) whenever the instantaneous beater brush speed drops below 2400 rpm, and when vacuum cleaner 10 is turned on, the beater brush speed must reach 2400 rpm within one second or motor 20 will be de-energized.

In the alternate embodiment of the invention, as shown in FIG. 8, a vacuum cleaner tachometer provides visual feedback to the user indicating the speed of a beater brush corresponding to brush 19. An additional timer 55 is also utilized to indicate a heavy load on the beater brush.

A Hall effect sensor 230 corresponding to sensor 23 again produces an output signal for each revolution of beater brush 19 when the rotating magnet corresponding to magnet 22 is juxtaposed to the sensor. If the time between sensor outputs exceeds the threshold time A of timer 340, the timer resets flip-flop 370. When the flip-flop 370 is thus reset, the output to buffer 79 will be low, causing triac 440 to turn off and thus de-energize motor 200. The red light 74 is energized, thereby indicating to the user that the beater brush is jammed.

If the time between sensor outputs does not exceed the threshold time A of timer 340, but exceeds the threshold time B of timer 55, flip-flop 370 remains set with triac 440 on, and motor 200 energized. However, under these conditions, the yellow light 64 will be energized, indicating to the user the existence of a heavy load on the beater brush.

Under normal operating conditions, when the power supply is turned on, monostable 400 is triggered and sets flip-flop 370, the output of which is sufficiently high to turn triac 440 on and thus energize motor 200. The time between sensor outputs will not exceed either of the thresholds A of timer 340 or B of timer 55, and thus, the green light 70 will be energized.

The threshold speed B of actuating timer 340 is set slower than the speed of the beater brush speed under normal conditions, but fast enough to quickly de-energize motor 200 as the beater brush corresponding to brush 19 becomes jammed. Typically, this threshold speed A may be set at 3000 rpm. The threshold speed B of timer 55 corresponds to a heavy load on the beater brush and is typically set at 3300 rpm. Therefore, if the instantaneous speed of the beater brush corresponding to brush 19 drops to or below 3300 rpm, the yellow light will be on. If it drops below 3000 rpm, the red light will be on and motor 200 will de-energize. If the beater brush speed exceeds 3300 rpm, the green light will be on, indicating the vacuum cleaner is operating under normal conditions.

The foregoing disclosure of specific embodiments is illustrative of the broad inventive concepts comprehended by the invention.

I claim:

1. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:

means for providing magnetic pulses at a rate directly corresponding to the speed of rotation of the beater brush; and control means for sensing said pulses and discontinuing energization of the motor whenever the rate of said pulses drops below a preselected value, said power transmission means comprising a driven pulley driven by the motor, a driver pulley for driving the beater brush, and a belt coupling said pulleys, and said control means for discontinuing energization of the motor comprises means including a first switching device which is latched during normal operation of the beater brush and unlatched if the time between said pulses exceeds a predetermined threshold time and a second switching device arranged to positively turn off said motor as an incident of the unlatching of said first switching device, for discontinuing such energization upon a preselected reduction in the speed of rotation of said beater brush from the normal operating speed thereof.

2. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, said power transmission means including a driven pulley driven by the motor, a driver pulley for driving the beater brush, and a belt coupling said pulleys, the improvement comprising:

means for providing magnetic pulses at a rate directly corresponding to the speed of rotation of the beater brush; and control means for sensing said pulses and discontinuing energization of the motor whenever the rate of said pulses drops below a preselected value, said control means comprising means for discontinuing such energization upon a preselected reduction in the speed of rotation of said beater brush from the normal operating speed thereof and means for providing a visual warning signal to the user of the vacuum cleaner structure of a reduction of speed of the beater brush from the normal operating speed less than said preselected reduction.

3. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:

means for discontinuing energization of the motor as a result of the speed of rotation of said beater brush dropping below a preselected minimum speed;

manually operable means for re-energizing the motor subsequent to such discontinuation of energization of the motor; and means for discontinuing the re-energization in the event the beater brush does not reach a preselected threshold speed within a preselected period of time.

4. The vacuum cleaner of claim 3 wherein said preselected threshold speed is the same as said preselected minimum speed.

5. The vacuum cleaner structure of claim 3 further including means for delaying said discontinuation of the energization of the motor until the end of a preselected period of time after the beater brush speed drops below said peselected minimum speed.

6. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:

means for causing energization of said drive motor; a timing means; and control means for discontinuing energization of the drive motor in the event the speed of rotation of the beater brush is not at least a preselected speed at the end of a preselected time period measured by said timing means after initiation of energization of said drive motor.

7. The vacuum cleaner structure of claim 6 wherein said time period is approximately one second.

8. The vacuum cleaner structure of claim 6 wherein said preselected speed is approximately 2400 rpm.

9. The vacuum cleaner structure of claim 6 wherein said control means includes a Hall effect sensor, magnet means rotatable with the beater brush for pulsing said sensor, means determining the rate of the pulses produced by said sensor to provide a signal corresponding directly to the speed of rotation of the beater brush, and means responsive to said signal for causing said discontinuation of energization of the motor.

10. The vacuum cleaner structure of claim 6 wherein indicating means are provided for indicating said discontinuing of energization of the motor.

11. The vacuum cleaner structure of claim 6 further including indicating means for indicating a preselected reduction in speed of said beater brush below the normal operating speed thereof.

12. The vacuum cleaner structure of claim 6 further including first indicating means for indicating said discontinuing of energization of the motor and second indicating means for indicating a preselected reduction in speed of said beater brush below the normal operating speed thereof.

13. The vacuum cleaner structure of claim 6 further including first indicating means for indicating a speed of rotation of the beater brush above a preselected high load speed, and a second indicating means for indicating a reduction of the speed of the beater brush to said preselected speed.

14. The vacuum cleaner structure of claim 6 further including first indicating means for indicating a speed of rotation of the beater brush above a preselected high load speed, a second indicating means for indicating a reduction of the speed of the beater brush to said preselected speed, and a third indicating means for indicating a further reduction in the speed of the beater brush below said preselected high load speed as resulting from a jammed condition thereof.

15. The vacuum cleaner structure of claim 6 further including first visual indicating means for indicating a speed of rotation of the beater brush above a preselected high load speed, and a second indicating means for indicating a reduction of the speed of the beater brush to said preselected speed.

16. The vacuum cleaner structure of claim 6 further including first indicating means for indicating a speed of rotation of the beater brush above a preselected high load speed, a second visual indicating means for indicating a reduction of the speed of the beater brush to said preselected speed, and a third indicating means for indicating a further reduction in the speed of the beater brush below said preselected high load speed as resulting from a jammed condition thereof.

17. The vacuum cleaner structure of claim 6 further including first indicating means for indicating a speed of rotation of the beater brush above a preselected high load speed, a second indicating means for indicating a reduction of the speed of the beater brush to said preselected speed, and a third indicating means for indicating a further reduction in the speed of the beater brush below said preselected high load speed as resulting from a jammed condition thereof, said control means being arranged to cause discontinuation of energization of the motor concurrently with the actuation of said third indicating means.

18. The vacuum cleaner structure of claim 6 wherein said control means further includes a second timing means for discontinuing energization of the motor as a result of the speed of rotation of said beater brush dropping below a preselected minimum speed, said first named timing means and said second timing means employing separate and distinct components to ensure precise timing of the different functions respectively associated with each of said timing means.

19. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:
  first indicating means for indicating a speed of rotation of the beater brush above a preselected high load speed;
  second indicating means for indicating a reduction of the speed of the beater brush to said preselected speed; and
  third indicating means for indicating a further reduction in the speed of the beater brush below said preselected high load speed as resulting from a jammed condition thereof.

20. The vacuum cleaner structure of claim 19 wherein said indicating means comprise visual indicating means.

21. The vacuum cleaner structure of claim 19 further including control means arranged to cause discontinuation of energization of the motor concurrently with the actuation of said third indicating means.

22. The vacuum cleaner structure of claim 21 wherein said monostable comprises a circuit including a NOR gate, and a resistor and a capacitor connected in parallel to the input of the NOR gate, said NOR gate being connected to said first named input of the flip-flop.

23. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:
  control means for causing energization of said drive motor;
  a flip-flop for controlling said control means to maintain said motor energized during a set condition of said flip-flop;
  a monostable connected to an input of the flip-flop for setting the flip-flop and maintaining the flip-flop set until the monostable times out;
  a timer connected to another input of the flip-flop for maintaining the flip-flop set in the event the output of the timer is above a preselected threshold value before the monostable times out; and
  means responsive to the rotational speed of the beater brush to provide a corresponding input to said timer and said monostable for causing said flip-flop to reset and discontinuing energization of said motor in the event the timer output drops below said threshold value.

24. The vacuum cleaner structure of claim 23 wherein said timer comprises a resistor and capacitor connected in series with said flip-flop input and to said speed-responsive means.

25. The vacuum cleaner structure of claim 23 wherein said timer comprises a resistor and capacitor connected in series with said flip-flop input and to said speed-responsive means, said resistor and capacitor being further connected to the input of a NOR gate to define with said NOR gate a second timer, and a circuit connected to the output of said second timer for providing a signal in the event the rotational speed of the beater brush drops below a preselected value.

26. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:
  means for causing energization of said drive motor;
  a first NOR gate;
  a second NOR gate;
  a series connected resistor and capacitor;
  a first connection from between the resistor and capacitor to an input of the first NOR gate and to an input of the second NOR gate;
  a second connector from the capacitor only to an input of the second NOR gate; and
  circuit means connected to said gates and series connected resistor and capacitor for delivering a pulsed signal thereto corresponding to the rotational speed of the beater brush and providing therefrom a first indication whenever the speed of the beater brush is above a first preselected speed and a second indication therefrom whenever the speed of the beater brush is below a second preselected speed above said first preselected speed and below the normal operating speed of the beater brush such as caused by a high load on the beater brush.

27. The vacuum cleaner structure of claim 26 wherein said second NOR gate comprises a portion of a flip-flop, said circuit means further including means for controlling said flip-flop to prevent energization of said motor in the event the beater brush does not reach said first preselected speed within a preselected period of time after initiation of energization of said motor.

28. The vacuum cleaner structure of claim 26 further including means directly connecting said input of the first NOR gate and a second input of the second NOR gate.

29. The vacuum cleaner structure of claim 26 wherein said first connection is to a plurality of inputs of said first NOR gate and said second connection is to a single input of said second NOR gate.

30. In a vacuum cleaner sturcture having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor, the improvement comprising:
  means for causing energization of said drive motor; and control means for discontinuing energization of the drive motor in the event the speed of rotation of the beater brush drops below a preselected speed, said control means including a sensor, means for pulsing said sensor for generating sensor outputs responsive to the speed of rotation of the beater brush, first timing means for delaying operation of said control means for an initial power up time period starting from the initiation of energization of said drive motor, and second timing means for initiating a control function in the event the time period between sensor outputs exceeds a preselected time period, said first and said second timing means employing separate distinct components for their respective timing functions.

* * * * *